United States Patent [19]

Burton

[11] Patent Number: 5,503,709

[45] Date of Patent: Apr. 2, 1996

[54] ENVIRONMENTALLY IMPROVED PROCESS FOR PREPARING RECYCLED LIGNOCELLULOSIC MATERIALS FOR BLEACHING

[76] Inventor: Steven W. Burton, 4655 Francisco Rd., Pensacola, Fla. 32504

[21] Appl. No.: 281,410

[22] Filed: Jul. 27, 1994

[51] Int. Cl.$^6$ .................................................. D21C 5/02
[52] U.S. Cl. ...................... 162/6; 162/5; 162/8; 162/29; 162/190
[58] Field of Search .................................. 162/5, 6, 8, 29, 162/37, 55, 65, 190, 72 B

[56] References Cited

U.S. PATENT DOCUMENTS

| 1,860,432 | 5/1932 | Richter . | |
|---|---|---|---|
| 3,251,730 | 5/1966 | Watanabe . | |
| 3,274,049 | 9/1966 | Gaschke et al. | 162/65 |
| 4,737,238 | 4/1988 | de Ruvo | 162/4 |
| 4,806,203 | 2/1989 | Elton | 162/19 |
| 4,946,556 | 8/1990 | Prough | 162/60 |
| 4,980,023 | 12/1990 | Salkinoja-Salonen | 162/135 |
| 5,011,572 | 4/1991 | Parthasarathy et al. | 162/65 |
| 5,091,054 | 2/1992 | Meier et al. | 162/65 |
| 5,147,503 | 9/1992 | Nguyen | 162/7 |
| 5,173,153 | 12/1992 | Terrett et al. | 162/40 |
| 5,179,021 | 1/1993 | du Manoir et al. | 435/278 |
| 5,302,244 | 4/1994 | Nguyen | 162/6 |

FOREIGN PATENT DOCUMENTS 1110411  10/1981  Canada .

OTHER PUBLICATIONS

Darlington, "Comparative Properties of Market Deinked Pulps", TAPPI Pulping Conference, p. 741 (1992).
"A Preliminary Engineering Study and Cost Implications of Converting Deinking Mills to Closed Cycle Operations," NCASI Special Report No. 94–03 (Mar. 1994).
Kohler, "Is Japanese Technology Right for Recycled Container–board in North America?", Recovery and Use of OCC, Chp. 3, p. 98 (1993).
Abrahamsson, "Oxygen/Sodium Carbonate Bleaching of Kraft Pulp Pre–treated with Nitrogen Dioxide with Oxygen," Svensk Papperstidniny (1983).
Markham et al., "Medium Consistency Oxygen Delignification of Kraft Pulp for Yield and Production Increase", TAPPI Pulping Conference, p. 165 (1981).
Markham et al., "Oxygen Bleaching of Secondary Fiber Grades", TAPPI Journal, p. 168 (Dec. 1988).
Healey, "Alkali Soaking Ups Quality, Yield of Occused in Boxboard Furnishes," Pulp and Paper, p. 136 (Sep. 1990).
Li et al., "The Effects of Alkaline Leaching on Pulp Bleachability and Physical Properties," TAPPI Journal, 76:12 p. 159 (Dec. 1993).
McEwen et al., "Improving the Repulpability of Wax Coated Corrugated Paperboard", TAPPI Journal, 76:7 p. 116 (Jul. 1993).

Primary Examiner—Karen M. Hastings

[57] ABSTRACT

Waste lignocellulosic material, for example brown kraft grocery bag and corrugated paperboard, is treated in a multi-step process to produce a recycle brownstock pulp having a sufficiently low kappa number that it may be bleached according to conventional means such that its final optical and strength properties are comparable to that of virgin pulps bleached according to similar means; biological enzymes are used in conjunction with medium consistency pulping to separate fibers and loosen contaminants, such as wax and adhesives; low temperature soaking of waste lignocellulosic material in an alkaline peroxide liquid using long reaction times is used to minimize energy consumption, degrade contaminants, and to selectively remove lignin; loosened contaminants and poorly bonding lignocellulose debris are removed by screening and cleaning methods; high consistency peroxygen cooking is used to substantially delignify the pulp and to destroy contaminants in an energy efficient manner; liquid streams are treated and internally recycled to reuse chemicals and to eliminate environmental liquid discharge; organic solids are recovered and incinerated as fuel to provide heat energy to the process; spent sodium salts are recovered as sodium hydroxide and reused in the process as a delignification agent; the recycled pulp can be employed in the manufacture of brown paper and paperboard products, or can be bleached to provide a pulp for white paper or paperboard products.

5 Claims, 2 Drawing Sheets

ENVIRONMENTALLY IMPROVED PROCESS FOR PREPARING RECYCLED LIGNOCELLULOSIC MATERIALS FOR BLEACHING

BACKGROUND

1. Field of Invention

This invention relates to a novel, environmentally acceptable process for recycling waste lignocellulosic material to produce a highly delignified pulp of acceptable strength and cleanliness; the invention relates particularly to a process of recycling which reduces the discharge of environmental pollutants.

2. Description of Prior Art

The manufacture of paper or paperboard generally involves the digestion of wood chips by the kraft pulping process to produce a lignocellulosic pulp mass which is comprised of two main components; a cellulosic component and a lignin component. The cellulosic component largely comprises the wood fiber while the lignin component is more concentrated between the fibers as a structural element binding wood fibers together. However, a substantial portion of the lignin is also distributed within the fibers themselves.

The kraft pulping process produces a dark colored mass of lignocellulose fibers commonly known as "brownstock". The dark color is due to the presence of chemically altered lignin which contains chromophoric groups. Further delignification processes such as oxygen delignification or chlorination are performed followed by bleaching processes to make a white colored pulp.

A brownstock pulp produced directly from the digestion of wood chips is generally referred to as a virgin pulp. In contrast, a brownstock pulp produced from the repulping of waste paperboard is generally referred to as a recycle pulp. In both cases, the residual lignin content of a brownstock pulp is indicated by its kappa number. Higher kappa numbers indicate higher residual lignin contents.

The kappa number of a brownstock pulp obtained from cooking softwood is typically 50 to 100, and such a pulp is used for making the linerboard component of corrugated paperboard. The kappa number of a brownstock pulp from cooking hardwood is typically 130 to 160, and such a pulp is used for making the corrugated medium component of corrugated paperboard. Corrugated paperboard waste comprising linerboard and corrugating medium generally has an overall kappa number of 80 to 120.

The kappa number of a softwood brownstock pulp would need to be reduced to about 25 to 35, and that of a hardwood brownstock to about 10 to 15 to provide a pulp suitable for bleaching to produce white paper products. However, the removal of lignin or delignification usually results in the degradation of the cellulose component as well. The relative difference between the extent of lignin degradation and cellulose degradation is commonly referred to as "selectivity".

A number of processes for delignifying pulp with oxygen have been proposed, such as Richter U.S. Pat. Nos. 1,860,432 (1932), Gaschke et al. 3,274,049 (1966), and Farley 3,251,730 (1972). The use of oxygen as a delignification agent, however, has not been a completely satisfactory one since it is less selective when compared to other agents such as elemental chlorine. Furthermore, the kappa number reduction that can be attained with oxygen delignification is limited to a level beyond which attack on cellulosic fibers becomes disproportionate.

Improved selectivity at a higher degree of delignification has been the object of numerous proposals to improve oxygen as a delignification agent. These include multi-stage oxygen treatment, alkaline pretreatment, use of hydrogen peroxide, and others. Oxygen delignification is usually carded out at medium consistency because high consistency operation typically results in the poorest chemical selectivity while low consistency operation typically results in the poorest delignification efficiency.

Alkaline pretreatment of pulp prior to oxygen delignification has been suggested by Elton in U.S. Pat. Nos. 4,806,203 (1989), and by Terrell et al. in 5,173,153 (1992). The use of multiple consecutive oxygen bleaching stages with interstage countercurrent washing has been proposed by Prough in U.S. Pat. No. 4,946,556 (1990).

The use of oxygen and alkaline pretreatment permits the recycling of effluent back to the kraft recovery boiler when mixed with the residue remaining after digesting wood chips. This residue, commonly known as black liquor, is collected, concentrated by means of evaporation, and then incinerated in a high temperature boiler, commonly known as a recovery boiler. This process provides a means for the recovery of energy and chemical value from the black liquor. The methods and apparatus used for recovery of pulping chemicals from black liquor is conventional and well known in the art.

The concentration and subsequent incineration of black liquor typically limits the pulp production rate in a kraft pulp mill. In order to substantially increase pulp production or to recover oxygen stage effluent, the evaporator systems and the recovery boiler often require modifications or replacement to handle the additional solids flow increase. Since the recovery operation is a source of a substantial proportion of a pulp mill's discharge of air pollutants, pollution abatement equipment must be upgraded as well.

The utilization of oxygen delignification and other associated alkaline pretreatment has the disadvantage of increasing the amount of black liquor residue that must be processed by a pulp mill recovery system. A substantial increase in black liquor residue typically requires modification of such systems as described above and thereby increases the potential level of air pollutants that may be emitted from the recovery boiler. Capital costs for these modifications involve millions of dollars of new investment.

Abrahamsson described a brownstock pretreatment with nitrogen dioxide to enhance the oxygen delignification process in "Oxygen/Sodium Carbonate Bleaching of Kraft Pulp Pretreated with Nitrogen Dioxide and Oxygen", *Svensk Papperstidning* (1983). Selectivity improvement was the object of Meier et al. in proposing a pretreatment with peroxomonosulfuric acid in U.S. Pat. No. 5,091,054 (1992).

A process for enhancing the bleachability of kraft brownstock is taught by du Manoir et al. in U.S. Pat. No. 5,179,021 (1993). This process involves a series treatment of oxygen delignification followed by xylanase enzyme treatment prior to a chlorination stage in a typical bleach plant. Such a process provides for a delignified and bleached pulp using lower amounts of chlorine containing compounds than previously taught in the prior art. However, xylanase pretreatment prior to an oxygen treatment stage has not been observed to substantially enhance oxygen delignification.

The use of hydrogen peroxide to brighten and delignify lignocellulosic pulps is well known in the art and widely used in commercial bleach plant installations. Its use has typically been limited to treatments of low kappa kraft pulps for bleaching because of its high chemical cost and because of its poorer selectivity in comparison to oxygen, chlorine, and chlorine dioxide.

The poorer selectivity of hydrogen peroxide is generally thought to result from decomposition reactions catalyzed by soluble metals and by elevated temperature. Hydrogen peroxide decomposes into oxygen and water with increasing pH, temperature, and heavy metal concentrations. Intermediate decomposition products are also produced, including radicals such as $HO°$ and $HOO°$, which lead to lower yields and strength by oxidation and degradation of lignin and cellulosic fibers. Stabilizing chemicals such as sodium silicates and chelants are well known additives used to reduce the decomposition rate of hydrogen peroxide.

The use of hydrogen peroxide in a two stage oxygen delignification process is proposed by Parthasarathy et al. in U.S. Pat. No. 5,011,572 (1991). The patent describes a method to improve the oxygen selectivity and degree of delignification of chemical pulp by the addition of hydrogen peroxide.

Hydrogen peroxide has also been widely used in brightening white pulp made from deinked wastepaper. Deinked wastepaper pulps are typically contaminated with residual inks which lower the visual brightness of a recycled pulp. Use of hydrogen peroxide for this purpose has grown substantially in recent years due to the increasing recovery of waste paper and paperboard products.

The total recovery of paper and paperboard for recycling purposes has been projected to increase to 49 million tons by the year 2000 as a result of the need to reduce the volume of waste paper and paperboard being landfilled. The recovery of kraft paperboard, particularly old corrugated containers, has increased substantially with an estimated 184% increase in recovery between the years 1985 and 1992.

Because of its high kappa number and high level of contaminants, waste paperboard has not been used for white paper manufacture. Its recovery has been typically limited to producing paperboard containing recycle fiber.

Several processes have been proposed or implemented for the recovery of kraft paperboard. Such processes generally involve the repulping of used paperboard, cleaning the resulting pulp of nonwoody contaminants, and mixing the cleaned pulp with virgin kraft pulp for the purpose of making kraft linerboard or corrugating medium components of corrugated paperboard. In general, the decontamination steps used in the art are not highly stringent since the recycle pulp is typically reused in paperboard. Substantial delignification steps are not required for recycling waste paperboard into paperboard products.

Recycle pulp fiber is usually mixed with a virgin pulp because the recycle fiber's strength is inferior due to its prior processing history. The strength differences between recycle and virgin pulp fibers are often substantial. This typically limits the recycle content in white papers to 20% by weight or less. Because of it's higher weight, paperboard products can utilize higher levels of recycle fiber.

In practice, some paperboard producers subject the recycle pulp to alkaline soaking to enhance the strength characteristics and to reduce the yield losses associated with screening as described by Kohler in "Is Japanese Technology Right for Recycled Containerboard in North America?", *Recovery and Reuse of OCC* (1993). However, one object of the treatment is to limit pulp delignification in order to minimize associated yield losses. The recycle pulp is often further subjected to treatments of starch and resins to reinforce the paperboard strength.

Modifications of the kraft cooking process have been proposed for treating waste paperboard for the purpose of delignifying the pulp to provide an improved product. In Canadian Pat. No. 1,110,411 (1981), Moore describes a process whereby wax coated or resin impregnated paperboard is repulped in an immersion of weak kraft black liquor at a temperature of 65° C. to 93° C. to enhance the repulping characteristics of the paperboard and to facilitate the separation of wax and resins from the fibers. Key to the process is the objective to separate the wax by melting it at elevated temperature. A disadvantage of the process is that a portion of the dissolved wax material will deposit back onto the pulp fibers as the pulp mixture cools. The deposited wax then inhibits bonding between fibers and acts to discolor the pulp in localized areas. Wax coatings, long used as an effective moisture barrier for packaging products, causes quality problems in recycle pulps. Therefore, waxed corrugated board is not an acceptable source of recycle fiber.

In U.S. Pat. No. 5,147,503 (1992), Nguyen describes a process for recycling waste paperboard which includes the digestion of paperboard in an alkaline cooking liquor, recovery of spent cooking chemicals, and the bleaching of the cooked pulp for the manufacture of white paper or paperboard. Nguyen's process is obviously very similar to the kraft pulping process and therefore retains disadvantages associated with kraft pulping such as high capital cost, process complexity, and the discharge of air pollutants. The kraft like processes described above require the utilization of sodium sulfide which leads to the generation and release of noxious sulfur compounds from the system. Furthermore, the economic viability of such processes are generally dependent on the integration into operations which have chemical recovery systems in place.

Oxygen delignification has been proposed for treating waste paperboard for the purpose of delignifying recycle pulp to provide an improved product. In U.S. Pat. No. 4,737,238 (1988), recycling of paper products containing aluminum is described by de Ruvo in which the screened pulp is subjected to oxygen delignification. In U.S. Pat. No. 5,302,244 (1994), Nguyen describes a process for recycling waste cellulosic paperboard which comprises subjecting paperboard to a pretreatment with sulfuric acid and then subjecting the recycle pulp to multiple stages of medium consistency oxygen delignification to produce a pulp with a kappa number of 15 to 35. As with previous processes, these methods rely on costly evaporation and incineration technologies to treat effluent streams.

Despite the research conducted in the area of pulp preparation, and despite the fact that paper recycling has been practiced for many years, the substantial recovery and reuse of paper and paperboard is a relatively recent phenomena. The art related to this practice is not well advanced so new processes for converting waste materials into improved quality products are needed. This is evident by the highly variable quality of existing recycle pulps as described by W. B. Darlington, "Comparative Properties of Market Deinked Pulps", *Tappi Pulping Conference*, pg 741 (1992).

Recycle pulps are generally weaker and more contaminated with extraneous materials than virgin pulps. Furthermore, because of prior processing, the drainage characteristics of recycle pulps are poorer in relation to virgin pulps. While these disadvantages present functional problems in the final paper product, they also create problems in the manufacturing process as well. The slower drainage characteristics and poorer strength of recycle pulps often require a paper machine to operate at a substantially lower production speed than it would otherwise run on virgin pulp. The contaminants present in the pulp generally result in defects in the paper which cause, upon substantial tension as in a paper making machine, initiation of a rapture or break of the paper thereby causing the machine to stop production. In printing operations, such contaminants can stick to printing blankets and cause the printing operation to cease.

The discharge of waste streams to the environment is a problem not satisfactorily treated in the prior art. This is of particular importance due to increasing regulatory pressure for expanded waste water treatment. In general, most proposed recycling processes rely on existing paper mill waste water treatment systems to treat collected waste water prior to discharge. Others rely on existing chemical recovery systems to evaporate and incinerate these waste streams. However, many pulp mills are limited in their ability to further process waste water or additional black liquor and therefore require substantial modification or replacement. Additional solids loading to such recovery systems typically increases the amount of air pollutants emitted from the process and therefore must be permitted for operation by regulatory agencies. In some cases, permits at higher air pollutant emissions are denied. A stand alone recycle process which recovers and reuses all liquid filtrate streams in an economical manner has yet to be developed and would therefore represent a significant advancement in the art.

Of particular problem in the recovery and reuse of liquid waste streams is the build up of organic and inorganic dissolved solids. Excessive build up of dissolved solids results in scaling and corrosion of process equipment and can affect the chemistry of bleaching and delignification. For example, excessive metal ions can decompose hydrogen peroxide into radicals which nonselectively react with cellulosic fibers.

Numerous treatment processes have been proposed to treat water for reuse in processing plants. Most conventional approaches involve the concentration of waste streams through evaporation and incineration to produce a solid ash residue. However, this is costly and presents problems associated with ash disposal and the emission of air pollutants. Other technology well known in the art include ultrafiltration, reverse osmosis, ion exchange, electrolysis, crystallization, biological treatment, and chemical precipitation. In general, the application of such technologies is costly with high operating and maintenance costs. Furthermore, concentrated waste streams are produced which must be further disposed of.

The National Council of the Pulp and Paper Industry for Air and Stream Improvement (NCASI) commissioned "A Preliminary Engineering Study and Cost Implication of Convening Deinking Mills to Closed Cycle Operations" *NCASI Special Report No. 94–03* (March 1994). In the study, a panel of industry experts identified a feasible waste water treatment scheme to accomplish complete closure of a recycle pulp plant which included primary and secondary biological treatment, filtration, microfiltration, reverse osmosis, evaporation, crystallization, incineration, and ash fixation. Ion exchange was not selected as a feasible treatment method. The total installed capital for treating the waste water from a hypothetical 300 ton per day recycle plant was $38 to $44 million dollars with operating and maintenance costs of $2.6 to $4.2 million dollars per year. The NCASI report illustrates the high cost and complexity associated with mill closure and demonstrates how those highly skilled in the art would approach this industry recognized problem.

OBJECTS AND ADVANTAGES

Accordingly, several objects and advantages of my invention are:

(a) to provide a multi-stage process for decontaminating and delignifying waste lignocellulosic products to produce a recycle brownstock pulp of consistent quality in a cost effective, energy efficient, and environmentally protective manner;

(b) to provide a process for recycling wax coated paperboard to produce a substantially decontaminated recycle brown stock pulp;

(c) to provide a process for substantially delignifying waste lignocellulosic material in a highly selective manner;

(d) to provide a recycle brownstock pulp which can be bleached, according to means well known in the art, whereby its brightness, strength, and cleanliness properties are superior to that of recycle deinked pulp;

(e) to provide a recycle brownstock pulp which can be bleached, according to means well known in the art, whereby the drainage characteristics of the bleached pulp is superior to that of recycle deinked pulp;

(f) to provide a process for delignifying waste lignocellulosic material which does not require sulfur based delignifying agents thereby substantially reducing the discharge of sulfur containing air pollutants;

(g) to provide a process which recovers, treats, and reuses liquid waste streams to eliminate the discharge of such polluting streams to the environment;

(h) to provide a pulp production process which can be used to increase an existing pulp mill's production rate with minimal impact on the mill's chemical recovery or waste treatment processes;

(i) to provide a process for producing a recycle brownstock pulp with less capital expenditure on plant and equipment as compared to prior art processes; and (j) to provide a process whereby chemical and energy values are recovered and exploited within the process.

Further objects and advantages of my invention will become apparent from a consideration of the drawings and ensuing description.

DRAWING FIGURES

Figure 1:
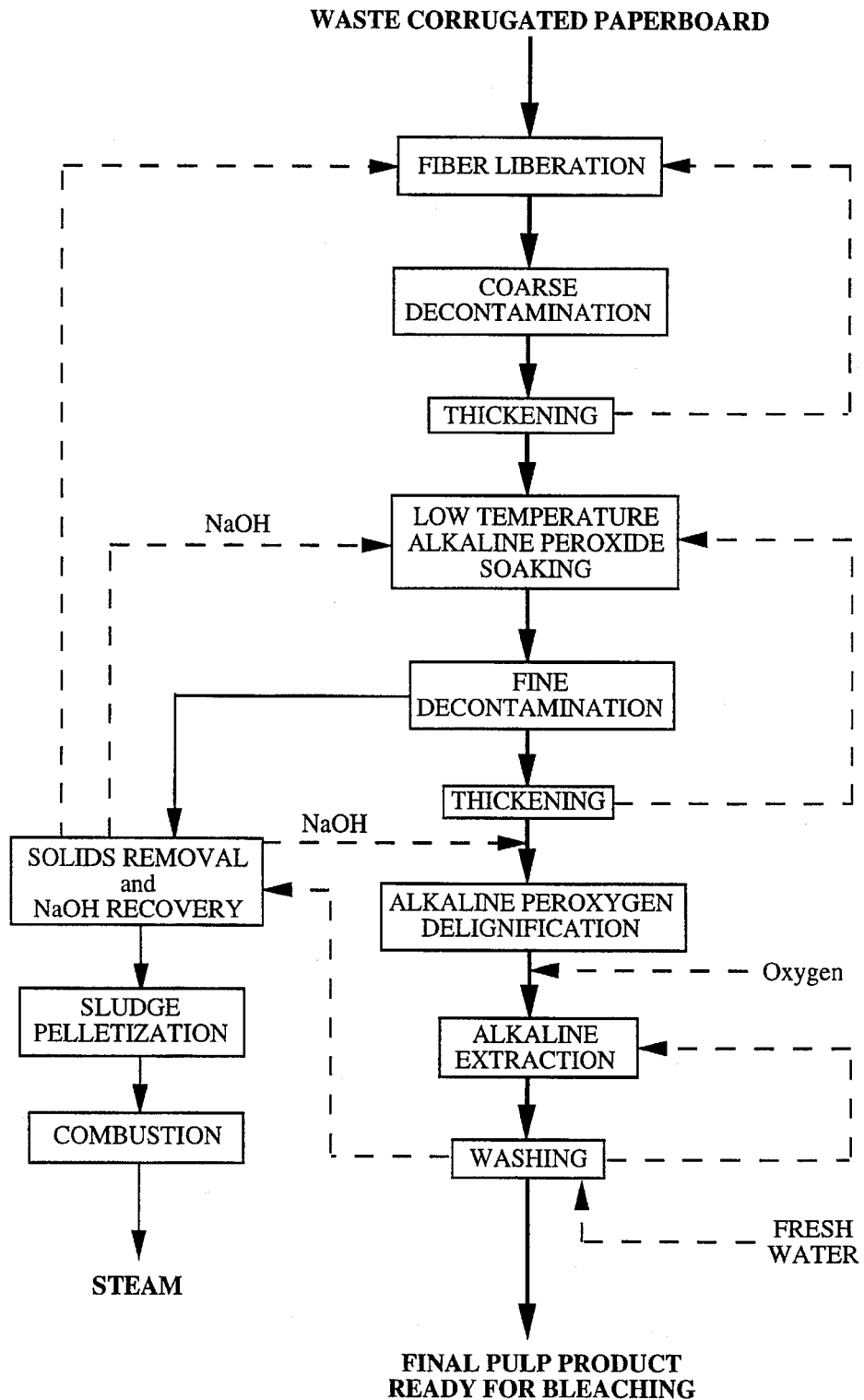
FIG. 1 is a block flow diagram of the preferred methods of this invention wherein a thick solid line represents pulp flow, a thin solid line represents sludge flow, and a broken line represents liquid flow.

| Reference Numerals in Drawings | |
|---|---|
| 1 waste paperboard or bags | 53 medium consistency pulp |
| 2 enzyme blend | 54 gaseous oxygen stream |
| 3 pulping unit | 55 pipeline |

| | |
|---|---|
| 4 unscreened pulp | 56 extraction vessel |
| 5 dilution filtrate | 57 washing filtrate |
| 6 conmdnants | 58 aler treated pulp |
| 7 size classffying screening unit | 59 first press washer |
| 8 cleaning unit | 60 washer filtrate |
| 9 dense contaminants | 61 washed pulp |
| 10 coarse decontaminated pulp | 62 press washer |
| 11 enzyme containing filtrate | 63 fresh water stream |
| 12 thickening unit | 64 medium consistency pulp |
| 13 high consistency pulp | 65 pulp storage vessel |
| 14 alkaline peroxide solution | 66 pulp ready for bleaching |
| 15 mix tank | 67 press washer filtrate |
| 16 second thickening unit | 68 contaminant storage tank |
| 17 alkaline filtrate | 69 sludge |
| 18 sodium hydroxide solution | 70 contaminant stream |
| 19 hydrogen peroxide solution | 71 rejects screening unit |
| 20 steam | 72 cleaned filtrate |
| 21 alkaline peroxide soaking tower | 73 solid contaminants from screen |
| 22 alkaline filtrate | 74 sludge from flotation/filtration unit |
| 23 low consistency pulp | 75 chemical flocculent |
| 24 primary screen feed stream | 76 flotation/filtration unit |
| 25 primary screening unit | 77 partially cleaned filtrate |
| 26 primary screen reject stream | 78 first stage ion exchange unit |
| 27 secondary screening unit | 79 sodium chloride solution |
| 28 secondary screen accept stream | 80 metal containing brine |
| 29 secondary screen reject stream | 81 feed to second ion exchange stage |
| 30 primary screen accept stream | 82 second stage ion exchange unit |
| 31 low density cleaning unit | 83 hydrochloric acid solution |
| 32 cleaning unit reject stream | 84 sodium chloride solution |
| 33 cleaning unit accept stream | 85 cleaned filtrate |
| 34 primary fractionating unit | 86 chemical precipitant |
| 35 primary fractionated reject stream | 87 clarifying unit |
| 36 primary fractionated accept stream | 88 clarified filtrate |
| 37 secondary fractionating unit | 89 process metals |
| 38 secondary fractionated accept stream | 90 chlorine-caustic electrolytic cell |
| 39 secondary fractionated reject sum | 91 sodium hydroxide solution |
| 40 peroxygen stage feed tank | 92 chlorine gas |
| 41 magnesium sulfate solution | 93 hydrogen gas |
| 42 peroxygen stage feed pulp | 94 combustion unit |
| 43 thickening unit | 95 hydrochloric acid gas |
| 44 alkaline filtrate | 96 cooling and absorption unit |
| 45 sodium hydroxide solution | 97 hydrochloric acid solution |
| 46 hydrogen peroxide solution | 98 combined sludge |
| 47 steam source | 99 sludge press |
| 48 fluffing unit | 100 sludge press filtrate |
| 49 peroxygen delignification vessel | 101 pelletizing unit |
| 50 gaseous oxygen stream | 102 fuel pellets |
| 51 washing filtrate | 103 combustion unit |
| 52 sodium hydroxide solution | 104 steam |

SUMMARY

This invention provides a novel multi-stage process for decontaminating and delignifying waste lignocellulosic products, particularly corrugated paperboard, to produce a recycle brownstock pulp in a more cost effective, energy efficient, and environmentally protective manner than has been attainable by prior art processes. The recycle pulp so produced can be bleached according to conventional methods whereby its strength, brightness, cleanliness, and drainage properties are superior to that of conventionally prepared recycle deinked pulps.

The process of the present invention is composed of five or more steps with a number of possible variations within and between these steps. The steps in this process may be described as follows:

A first step in the process involves the liberation and treatment of the lignocellulosic fibers from the recycled waste material into a pulp mass having a kappa number as high as 120. Fiber liberation is achieved in a conventional pulping unit using a combination of mechanical attrition, fiber swelling, and the selective action of biological enzymes on the lignocellulosic material.

Key to the decontamination aspect of my invention is the intent to keep waxy materials in a flaky solid phase that can be easily removed from the pulp mixture. Therefore, the pulp is preferably maintained during fiber liberation at a temperature which is at least 10° C. below the melting point of waxy contaminants. Enzymes assist in the separation of the contaminants from the fiber surface.

A second step in the process involves the removal of coarse contaminants through the use of well known screening and cleaning methods. Usually included in these coarse contaminants are rocks, metal, plastics, and wax flakes. Upon thickening the pulp, filtrate is collected for reuse in the fiber liberation step.

A third step of the process includes an alkaline peroxide soaking treatment at medium to high consistency, low temperature, and long treatment time to provide a uniform and thorough distribution of delignifying chemicals and to keep the chemical reaction rate low. These conditions facilitate highly selective attack on lignin with minimal degradation of cellulose, minimize energy requirements, and ensure the solidity of wax-like materials for future removal by screening. The alkaline conditions swell the fibers, reduce the potential for acidic degradation of the fibers, and increase the potential for hydrogen bonding sites thereby improving the papermaking strength of the fiber.

A fourth step in the process involves further decontamination of the brownstock to remove small and lightweight contaminants in a series of conventional screening and cleaning methods. Although numerous combinations of the various types of commercial equipment may be used, the preferred embodiment first involves a screening stage which removes larger contaminants followed by a cleaning stage which removes low density or lightweight material such as wax flakes, plastics, and other types of potentially sticky material. Low density cleaning is then followed by a fractionating stage which selectively removes fine fiber debris which act as poor bonding materials and contribute to poor drainage characteristics.

A fifth step of the process includes a high consistency peroxygen delignification treatment to substantially remove lignin without an accompanying significant loss in cellulosic fiber strength. During the peroxygen delignification step, the pulp is preferably maintained at a temperature between 90° C. and 100° C. and at a pressure between 550 kPa and 825 kPa to decrease the kappa number of the pulp by about 75% without severely degrading the cellulosic strength of the fiber. The selectivity, indicated by the ratio of the kappa number decrease to the viscosity decrease, is typically better than 1.40. For the processing of old corrugated paperboard a kappa number of 25 and a viscosity of greater than 9 mPa.s is easily achieved.

A sixth step in the process includes the extraction and washing of dissolved organics from the fiber pulp. The pulp is allowed to further soak in caustic chemicals for a predetermined time at a predetermined temperature for the purpose of solubilizing a substantial portion of any lignin material which remains in the pulp. Thereafter, the pulp is washed in one or more press type washing stages to remove substantially all of the solubilized lignin therefrom.

A portion of the filtrate from the first washing stage is recovered and treated under predetermined pH conditions with conventional chemical precipitants. Flocculated solids are then removed by conventional separation methods, combined with screening and cleaning rejects, and formed into pellets which are then burned to recover their energy value for the process.

The filtrate is further treated to remove inorganic dissolved solids through the use of well known ion exchange methods. Sodium ion, being the predominant dissolved solid is recovered in the form of a sodium chloride solution and treated in an electrolytic cell to generate sodium hydroxide which is then reused in the process as a delignifying agent. By-products from the caustic generation, chlorine and hydrogen gas, are also recovered and combusted to form hydrochloric acid which is then used in the process to regenerate the ion exchange columns. The filtrate which has been substantially reduced in dissolved solids is then used as make-up water in the fiber liberation step. The internal treatment and recycle of filtrates and the recovery of pulping chemicals eliminates the sewering of liquid streams to the environment.

Figure 2:
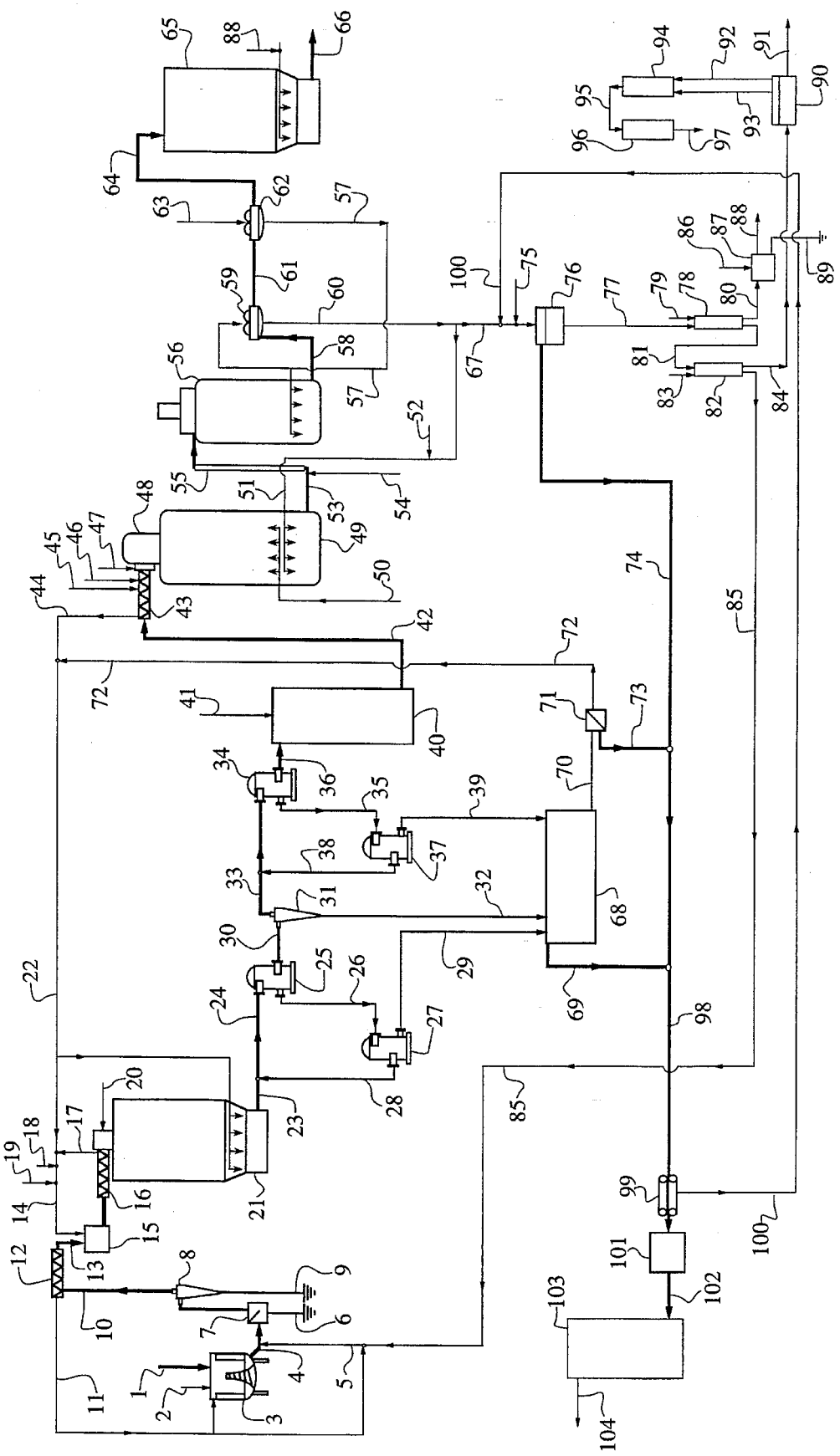
FIG. 2 is a schematic illustration of one embodiment of the present invention for producing a recycle brownstock pulp.

Description—FIGS. 1 to 2

The present invention relates to a novel, environmentally acceptable process for the recycling of waste lignocellulosic material which includes multiple steps of fiber liberation, coarse decontamination, alkaline peroxide soaking, fine decontamination, peroxygen delignification, caustic extraction, and washing to produce a lignocellulose fiber pulp while minimizing the extent of degradation of the cellulose component, thus forming an unbleached product of acceptable properties for the manufacture of paper products. The process also includes the recovery and treatment of waste streams to recover chemical and energy values and to eliminate the discharge of such streams to the environment. In order to provide understanding of the improvement over the prior art offered with the use of the presently disclosed invention, definitions of several parameters associated with the invention are provided below.

a. General Definitions

Throughout this specification, the following definitions will be used:

"Consistency" is defined as a measure of wood fiber in a fiber-water mixture, expressed as a percentage of the total weight of the mixture. The pulp consistency will depend upon the treatment stage the pulp is exposed to as well as the dewatering equipment used. Certain consistency ranges are preferred, depending on the purpose of the suspension media.

"Low consistency" pulp is defined as being a consistency less than 6% and is generally useful for pulp transport by centrifugal pumps which are common in the pulp and paper industry. This degree of consistency, particularly less than 3%, is preferable for efficient screening and cleaning. Dilution to low consistency prior to washing is common for facilitating a high degree of washing.

"Medium consistency" pulp is defined as being an intermediate consistency between 6% and 18%. Consistencies of 12% to 16% are commonly reflected in the degree of dewatering achieved by vacuum type washers. Special pumps are available for transport under these conditions. Medium consistency is preferred in some unit operations because it reduces the volumetric requirement of storage and allows increased concentration of chemicals in the suspension media.

"High consistency" is defined as being a consistency above 18% and is typically attainable through the use of specially made presses. The liquid phase is internally located with respect to the fibers and the pulp feels somewhat dry to the touch. High consistency pulp is generally not pumped but must be conveyed by screw type devices or other conveyors. This consistency is often preferred for minimizing water barriers, particularly when facilitating gas phase chemical reactions. Minimizing the water barrier reduces carryover of extraneous organic materials and enhances the physical accessibility of chemicals such as oxygen, ozone, or chlorine dioxide.

"Pulping", is generally used to describe the digestion of wood products for the selective removal of lignin. However, in describing this invention, pulping will be defined as the liberation of fibers from the raw material such as corrugated paperboard into individual fibers in a fluid media. The term "fiber liberation" is often used in place of the "pulping" term.

"Delignification" is a term defined to represent the selective removal of lignin from the wood fibers. The degree of delignification is a measure of the extent of lignin removal from the wood fibers during some chemical treatment. The degree is typically measured from the change in kappa number of the pulp as it passes across a given treatment stage.

"Peroxygen delignification" is defined as a method of delignification in which hydrogen peroxide and oxygen are used to delignify pulp under alkaline, pressurized conditions.

"Selectivity" is a term defined as a relative measure of lignin degradation to cellulose degradation. This measure is typically calculated by dividing the percent kappa decrease by the percent viscosity decrease.

"Extraction" is a term defined as a chemical treatment stage for solubilizing organic materials under alkaline conditions.

"Bleachability" is a term defined as relating to the ease by which a brightness is attained as measured by bleaching chemical consumption, as well as the extent of brightening that may ultimately be attained as measured by the brightness test.

b. Process Steps of the Invention

For convenience in understanding the present invention, FIG. 1 sets forth, in a schematic form, the various stages utilized in pulping, delignifying, and decontaminating a waste lignocellulosic material according to the invention. As illustrated in FIG. 1, the invention comprises a multi-stage process including the steps of:

(a) pulping a waste lignocellulosic paper or paperboard to substantially liberate individual fibers and contaminants through the use of mechanical attrition and enzyme treatment at medium consistency whereby specific chemical bonds are broken such that greater delignification, improved decontamination, and increased strength development is achieved in subsequent processing stages;

(b) screening and cleaning at low consistency to decontaminate the pulp of heavy or coarse materials in a manner well-known in the art;

(c) thickening the pulp to high consistency whereby a portion of the enzyme containing filtrate may be recovered and reused in the fiber liberation step and whereby the treated pulp volume may be reduced such that the storage requirements in the subsequent soaking step can be minimized;

(d) low temperature alkaline peroxide soaking treatment of the pulp to cause separation of contaminants from the fibers and to substantially delignify the pulp and induce fiber swelling whereby strength potential is increased;

(e) screening, cleaning, and fractionating to further decontaminate the pulp of lightweight materials and poorly bonding fiber debris whereby contaminants are collected as a sludge and processed into an organic fuel for energy recovery;

(f) thickening the pulp to high consistency whereby soaking chemicals may be recovered and reused in the alkaline soaking step and whereby the pulp liquid volume is reduced such that the chemical reaction rates in the subsequent peroxygen delignification step are enhanced and the energy requirement for heating the pulp is minimized;

(g) alkaline peroxygen treatment at high consistency and elevated temperature and pressure conditions to substantially delignify the pulp with minimal degradation of the cellulosic fiber;

(h) caustic oxygen treatment of the pulp upon discharge to complete delignification and to increase the stock pH for the subsequent extraction stage;

(i) alkaline extraction of the delignified pulp to solubilize residual lignin from the fiber;

(j) washing the extracted pulp with fresh water to remove chemical residues from the pulping liquor together with dissolved lignin, while recycling at least a portion of the effluent from this step to a previous step and at least a portion of the effluent to a separate treatment step whereby dissolved and suspended solids are removed;

(k) treatment of the effluent to remove a substantial portion of organic solids as a sludge for energy recovery and to remove and convert a substantial portion of the sodium ions to a sodium hydroxide solution for reuse in the process whereby the treated washing filtrate may be reused in the process;

(l) pelletizing the collected sludge to produce a material which can be burned to recover a substantial portion of its energy value; and, (m) production of an unbleached pulp having a kappa number of about 25 with bleachability and strength potential comparable to a typical kraft brownstock pulp.

A processing scheme for carrying out the method of the present invention is depicted in schematic form in FIG. 2. The steps depicted therein represent a preferred operating system that tends to maximize certain benefits of the present invention. Waste paperboard or bags 1 and an enzyme blend 2 are introduced to a pulping unit 3 where they are retained for mechanical and enzymatic liberation to substantially individual fibers and contaminants. The pulping unit 3 produces an unscreened pulp 4 which is diluted with a dilution filtrate 5; screened of contaminants 6 in a size classifying screening unit 7; cleaned of dense contaminants 9 in a cleaning unit 8 to produce a coarse decontaminated pulp 10; and thickened in a thickening unit 12 with an enzyme containing filtrate 11 being recovered for reuse in the pulping unit 3. A high consistency pulp 13 is diluted with an alkaline peroxide solution 14 to uniformly mix with the pulp 13 in a mix tank 15 before thickening in a second thickening unit 16. An alkaline filtrate 17 is recovered, reinforced with a sodium hydroxide solution 18 and a hydrogen peroxide solution 19 to produce the alkaline peroxide solution 14.

After the second thickener 16, the pulp is heated with steam 20 to control temperature to about 50° C. and is then discharged into an alkaline peroxide soaking tower 21 with a retention time of 16 to 24 hours. At the bottom of the alkaline peroxide soaking tower 21 the pulp is diluted with an alkaline filtrate 22 and discharged as a low consistency pulp 23. The pulp is diluted further with a secondary screen accept stream 28 before being screened in a primary screening unit 25. A reject stream 26 is rescreened in a secondary screening unit 27 while the primary screen accept stream 30 is cleaned of lightweight material in a low density cleaning unit 31. A secondary screen reject stream 29 and a cleaning unit reject stream 32 are sent to a contaminant storage tank 68. A cleaning unit accept stream 33 is fractionated in a primary fractionating unit 34. A rejects stream 35 is rescreened in a secondary fractionating unit 37 to produce an accepts stream 38 which is recombined with the cleaning unit accept stream 33. A secondary fractionated reject stream 39 is collected in the contaminant storage tank 68. A primary fractionated accept stream 36 is sent to a peroxygen stage feed tank 40 where it is combined with a magnesium sulfate solution 41.

A peroxygen stage feed pulp 42 is thickened in a thickening unit 43 to high consistency, mixed with a sodium hydroxide solution 45 and a hydrogen peroxide solution 46, and heated with a steam source 47 before being fluffed in a fluffing unit 48. Fluffed pulp at high consistency drops into a pressurized peroxygen delignification vessel 49 where a gaseous oxygen stream 50 is added to induce delignification reactions. After a retention time of about 30 minutes, pulp is diluted to medium consistency with a washing filtrate 51 which has been heated and reinforced with a sodium hydroxide solution 52. The medium consistency pulp 53, upon discharge, is further treated with a gaseous oxygen stream 54 in a pipeline 55 which leads to an extraction vessel 56.

After a period of caustic extraction, extracted pulp is further diluted with a washing filtrate 57 and sent to a first press washer 59. A portion of the filtrate from washer 59 is used as dilution in the bottom of peroxygen stage 49 while a portion of washer filtrate 60 is recovered for treatment. A washed pulp 61 is washed a second time in a press washer 62 with a fresh water stream 63 and is then discharged as a medium consistency pulp 64 to be stored in a pulp storage vessel 65.

A contaminant stream 70 from the contaminant storage tank 68 is separated from most of the carder filtrate in a rejects screening unit 71 whereby a cleaned filtrate 72 is recovered for reuse and combined with alkaline filtrate 44 to form alkaline filtrate 22.

The press washer filtrate 67 is treated with a chemical flocculent 75 to coagulate organic solids which are removed as a sludge in a combined flotation/filtration unit 76. A partially cleaned filtrate 77 is further treated in a first stage ion exchange unit 78 to remove process metal ions and in a second stage ion exchange unit 82 to recover sodium ions as a concentrated sodium chloride solution 84. The sodium chloride solution 84 is treated further in a chlorine-caustic electrolytic cell 90 to produce a sodium hydroxide solution 91 which is reused in the process, with a chlorine gas 92 and a hydrogen gas 93 as by products. The by product gases are combusted in a combustion unit 94 to produce a hydrochloric gas 95 of high purity which is then condensed in a cooling absorption unit 96 to produce a hydrochloric acid 97 which is used in the process.

The first ion exchange unit 78 is regenerated with a sodium chloride solution 79 to produce a metal containing brine 80 which is subsequently treated with a chemical precipitant 86 to remove process metals 89 in a solid form from the bottom of a clarifying unit 87. The clarified filtrate 88 is then used as dilution water in pulp storage tower 65.

The second ion exchange unit 82 is regenerated with a hydrochloric acid solution 83 to produce a sodium chloride brine 84 which is subsequently convened to sodium hydroxide 91 as previously described.

A sludge 69 is skimmed from the surface of the contaminant storage tank 68 and combined with sludges from the rejects screen 71 and flotation/filtration unit 76 to produce a combined sludge 98. Sludge mixture 98 is pressed in a conventional sludge press 99 and molded in a conventional pelletizing unit 101 to produce fuel pellets 102 which are subsequently burned in a combustion unit 103 to generate steam 104 for use in the process. A sludge press filtrate 100 is sent back and combined with press washer filtrate 67 for retreatment. A cleaned filtrate 85 is recovered as makeup water to be used in pulping unit 3.

Substantially delignified brownstock pulp 66 is produced from the process described above and subsequently bleached according to known methods.

From the description above, a number of advantages of the present invention become evident:

(a) Substantial delignification is achieved using high chemical concentration at medium to high consistency while under mild treatment conditions of temperature and pressure thereby minimizing capital cost requirements of the process.

(b) Pulping and alkaline peroxide soaking of the waste paperboard at low temperature enables substantial removal of wax like contaminants in a solid form that can be concentrated into a residue and combusted for the recovery of energy.

(c) The use of a single stage of high consistency peroxygen delignification allows substantial delignification in a highly selective and energy efficient manner.

(d) The use of oxygen, hydrogen peroxide, and sodium hydroxide as primary delignification agents substantially reduces the generation of air pollutants, particularly sulfur containing pollutants which are highly regulated in the industry.

(e) The removal of suspended and dissolved solids from the recovered wash filtrate substantially reduces the discharge of environmental pollutants by allowing reuse of liquid streams without substantial corrosion and scaling effects typically associated with high levels of such solids.

(f) The recovery of sodium hydroxide through ion exchange and chemical electrolysis substantially improves the chemical economy of the process.

(g) The substantial delignification and closed cycle nature of the present invention enables the process to be used to increase pulp production at an existing pulp mill operation without substantially affecting the waste treatment or chemical recovery processes of the mill.

Operation—FIGS. 1, 2

The ability of the recycling process, as set forth below, to convert waste lignocellulosic products such as kraft grocery bag or corrugated paperboard into a bleachable grade pulp with properties superior to deinked recycle pulp and comparable to virgin kraft pulp is demonstrated by the level of delignification obtained (indicated by kappa number), ease of bleaching observed (indicated by chemical requirements for bleaching), strength level developed (indicated by tensile strength), and cleanliness observed (indicated by dirt count and screen rejects content).

After fiber liberation, decontamination, and alkaline peroxide soaking, the pulp has been delignified to a kappa number between 45 and 75, typically about 65. This partially delignified pulp has a tensile strength of above 1.75 kN/m, preferably at least 2.28 kN/m. The dirt count observed in the pulp would typically be greater than 55 $mm^2/m^2$. This pulp thus has a reasonably high level of lignin and contaminant material to be eliminated with substantial strength potential to be developed in the peroxygen delignification step. The partially delignified pulp is subjected to a single stage of high consistency peroxygen treatment to further delignify the pulp, destroy contaminants, and to develop pulp strength. Extraction and washing steps are then used to solubilize and remove organic materials from the pulp. The resulting pulp typically has a kappa of 20 to 30 with a strength level of 2.63 kN/m. Contaminant level, as indicated by dirt count is typically in the range of 5 $mm^2/m^2$ to 15 $mm^2/m^2$. Thereafter, the pulp may be bleached using conventional bleaching practices to produce brightness levels comparable to virgin kraft pulp and superior to deinked recycle pulp. Bleach chemical consumption to a desired brightness is similar or slightly lower than virgin kraft softwood pulp of the same starting kappa number.

1. Fiber Liberation

The first stage in the method of the present invention wherein procedures are used to process waste paperboard 1 for the purpose of separating individual fibers from each other and from surface contaminants in the form of wax, plastic, starch, and other materials, is the fiber liberation step. A number of different types of pulping units may be used in this step although those which function at medium consistency would be the preferred embodiment of this invention.

The separation treatment induced by the mechanical shear forces of pulping unit 3 causes a rubbing action between fiber surfaces to condition such surfaces to develop improved bonding locations and to scrape away any contaminant materials that may be present. This mechanical action is facilitated by the absorption of filtrate 11 added to the pulper which swells the fibers thereby breaking fiber to fiber bonds and preventing tearing actions on the individual fibers.

An enzyme blend 2 is applied to waste material 1 in pulper 3 and allowed to act on the lignocellulosic material to facilitate the delignifying action in subsequent treatment steps, to aid the separation of contaminants from fibers, and to weaken the structure of wax containing contaminants. While a number of different enzymes may be used which have optimum activity at various conditions, the preferred embodiment of this invention includes the blending of cellulase, xylanase, and lipase enzymes. The cellulase and xylanase enzymes act directly on the fiber surface to break or weaken the surface microfibrils such that shear forces can more easily separate the contaminants from the fiber. In contrast, the lipase acts directly on the fatty acid components of wax contaminants to weaken the structure such that shear forces can separate it more completely from the fiber surface.

A second action of the xylanase is to break bonds between the hemicellulose and lignin components of the lignocellulosic material such that subsequent delignifying steps can proceed to a greater extent at a lower chemical application and thereby improve the selectivity of the chemical reactions such that significant degradation of the cellulosic material is avoided.

A key object of the fiber liberation step is to maintain wax coatings in a flaky solid phase of sufficient size to be easily removed in subsequent screening and cleaning units. This is achieved primarily by maintaining the pulping temperature at least 10° C. below the wax melting point which is typically about 60° C. Enzyme blend 2 helps facilitate separation of the wax flake from the fiber surface.

The fiber liberation step is preferably carried out at a consistency between 6% and 18% and at a temperature between 40° C. and 50° C. This combination is compatible for the duel purpose of keeping below the wax melting point as well as being appropriate for maintaining the efficacy of the enzyme components during the treatment. It is also preferable to maintain the pH at a level compatible with the selected enzyme used. Since different organisms produce enzymes which differ in the pH level at which the enzyme's activity is optimum, the preferred treatment pH must be identified for the specific enzyme used. In general, therefore, the preferred pH of this stage will range between 4.0 and 9.0. The dispersed pulp mass has a kappa number of 80 to 120.

In a second embodiment of the present invention, the pH may be adjusted to an acidic level during the fiber liberation stage with a peroxyacid such as peroxyacetic, peroxyformic, or peroxymonosulfuric acid. Such treatment may be performed in combination with an acid compatible enzyme treatment to provide enhanced peroxygen delignification in subsequent treatment stages.

The fiber liberation step is preferably carried out for a period of one to two hours. Shorter times may be used but will result in less efficient fiber liberation as evidenced by large clumps of fibers and contaminants. In pulping stages carded out in a manner well known in the art, faster fiber liberation can be achieved through the application of alkali and steam to achieve a temperature much higher than taught in the present invention. Additional time in the present invention is also preferred to achieve sufficient effects from the enzymes applied in the treatment. At treatment times greater than two hours, the benefits of enzyme treatment diminish.

2. Coarse Decontamination

The next step in the method of the present invention involves the removal of coarse contaminants from pulp 4, the thickening of the pulp for the subsequent process step, and the recovery of an enzyme containing filtrate 11 for reuse in the pulping step described above. The equipment used in this process step is well known in the art and can be used in a variety of configurations. In the present invention, the removal of coarse contaminants is achieved by a coarse barrier screening unit 7 followed by a density cleaning unit 8 to remove solid contaminants 6 and 9.

After the screening and cleaning steps are complete, pulp 10 is thickened to high consistency in thickener 12 whereby filtrate 11 is recovered and reused in pulper 3. The preferred embodiment of this invention is to achieve about a 35% consistency pulp, or a 30% or 40% consistency pulp, 13 exiting thickening unit 12.

3. Alkaline Peroxide Soaking

The next step in the method of the present invention concerns the portion of the process which involves the soaking of the pulp at medium to high consistency to complete the liberation of fibers from one another; to complete separation of contaminants from fibers; to chemically degrade certain contaminants in the pulp; and to selectively remove lignin from the pulp in a manner such that the cellulosic component of the pulp is not significantly degraded.

The alkaline peroxide soaking step is initiated by the dilution of thickened pulp 13 with an alkaline peroxide solution 14 to achieve a low consistency of about 2% to 4%. Exposure of the pulp to the soaking chemicals at low consistency in mix tank 15 for preferably one to five minutes ensures a uniform distribution of chemicals before thickening a second time in thickener 16 to produce a medium to high consistency pulp (15% to 20% consistincy) which is allowed to soak in tower 21 for a preferred time of 16 to 24 hours. Alkaline filtrate 17 is removed during thickening and combined with recycled filtrate 22, reinforced with sodium hydroxide 18 and hydrogen peroxide 19 solutions to produce alkaline peroxide solution 14.

The multi-step thickening is an important aspect of the present invention in that it provides a kneading action to the pulp to affect the fiber surface such that fiber swelling is enhanced and the potential for hydrogen bonding sites is enhanced thereby improving the ultimate papermaking strength of the fiber. The alkaline conditions further enhance fiber swelling and reduce the potential for acidic degradation of the fibers.

It has been found that the alkaline peroxide soaking step can be conducted in a manner which allows for the removal of increasing amounts of lignin material while limiting the degradation of the cellulosic materials. It has also been found that the soaking step allows for the reduction in the amount of unliberated fiber flocs rejected in subsequent screening steps. Broadly, the process which has been identified is practiced by uniformly treating the pulp with a strongly alkaline solution and allowing the mixture to soak for an extended period of time at low temperature 40° to 50°

C., to form a partially delignified pulp of about 70 kappa units or less. Key to the process is maintaining the chemical reaction kinetics at a low rate which improves the selectivity of the peroxide and minimizes thermal and transition metal induced decay of hydrogen peroxide to less selective chemical agents.

The enhanced selectivity of the alkaline peroxide soaking stage is achieved primarily by operating at a substantially reduced temperature than practiced commercially. Higher chemical concentration is economically achieved at the elevated consistency which is necessary to drive the chemical reaction at the lower temperature. Hence, this invention describes a manner of treatment in which the action of the hydrogen peroxide is more efficient and selective in its action as compared with standard practices.

Whereas fiber liberation during the pulping step was achieved largely through the use of mechanical forces, the fiber liberation achieved in the soaking stage is achieved chemically. This liberation is reflected by a reduction in the screening reject stream 29. The amount of screen rejects has been found to be substantially reduced by increasing the soak time and the chemical concentration in the soaking stage, and by applying enzyme blend 2 in pulping unit 3. Such rejects 29 would typically be composed of fiber bundles which resist liberation into individual fibers.

Operation of the soaking treatment stage is preferably carried out at 40° C. to 50° C. as performed in the previous fiber liberation step which substantially reduces the energy requirements of the present invention as compared with the prior art. The low treatment temperature is also a key process parameter for maintaining wax components in a solid phase for subsequent removal in screening unit 25 and cleaning unit 31.

The alkaline peroxide soaking step is preferably carried out in the presence of an aqueous alkaline solution at a pulp consistency of 10% to 25%, and even more preferably at 16%. This improved process allows for the removal of up to 60% of the residual lignin from the brownstock pulp with a selectivity of 0.50, compared to about 40% lignin removed with a selectivity of 0.40 obtained with conventional alkaline peroxide treatment at higher temperature but similar peroxide application levels.

The aqueous alkaline peroxide solution is preferably present in an amount sufficient to give a concentration of 2.5 gpl of NaOH and 1.5 gpl of $H_2O_2$ during the soaking treatment to achieve a delignification level of 18% with a selectivity of about 0.55. Since an excess of chemicals is applied in the soaking treatment, residual chemicals are carded forward with the pulp to be used in the peroxygen delignification unit 49 or recovered and reused in a dilution filtrate 22 for the soaking stage.

4. Fine Decontamination

The next step in the method of the present invention concerns the portion of the process which involves the removal of the remaining contaminants from the pulp. Treated pulp 23 from soaking tower 21 is diluted to low consistency for pressure screening and cleaning according to process means well known in the art. The preferred embodiment of the present invention is to include a primary screening unit 25 which utilizes a barrier screen with holes for the removal of the coarse contaminants remaining in the pulp; a secondary screening unit 27 which utilizes a similar hole barrier screen for the recovery of usable fiber from the primary screen reject stream 26; a low density cleaning unit 31 for the removal of lightweight contaminants (plastics and wax flakes) from accepts stream 30 of screening unit 25; a primary fractionating unit 34 which utilizes a barrier screen with slots for the removal of small lignocellulosic debris; and a secondary fractionating unit 37 which utilizes a similar slotted barrier screen for the recovery of usable fiber from the primary fractionated reject stream 35. Although this is the preferred embodiment, numerous other screening, cleaning, and fractionating combinations can be designed for accomplishing the fine decontamination step.

Removal of sand, plastics, and waxes are important for maintaining the cleanliness of the pulp and is accomplished primarily in the screening and cleaning units. In contrast, the fractionating step is intended to affect the strength and drainage characteristics of the pulp by removing small lignocellulosic debris which act as poor bonding agents and also inhibit the drainage of water from the pulp mat during paper making operations. It has been found that the strength potential of the pulp can be improved by about 10% through the selective removal of the small debris and that the drainage rate as measured by the freeness test can be improved by 20%. The fractionated pulp has a CSF of 675 ml to 75 ml.

The reject streams from screening unit 27, cleaning unit 31, and fractionating unit 37 are too contaminated for further use as a pulp fiber. In the present invention, these materials are collected in a reject storage tank 68. Lightweight material is skimmed from the surface of tank 68 and collected as a sludge 69. Stored contaminants are concentrated as a sludge 73, mixed with sludge 74 and sludge 69 to form a sludge mixture 98. Although some inorganic sand and grit will be present, a substantial portion of sludge 98 is composed of organic material with a high fuel value. A sludge press 99 and pelletizing unit 101 are used to produce a substantially dewatered fuel pellet 102 which may be burned in combustion unit 103.

5. Alkaline Peroxygen Delignification

The next step in the method of the present invention concerns the portion of the process which involves further delignification of the recycled brownstock. Prior to peroxygen treatment, pulp 42 is thickened to high consistency, treated with sodium hydroxide 45 and hydrogen peroxide 46 solutions, heated with steam 47 to a predetermined temperature, and comminuted to a suitable size in fluffing unit 48 to facilitate a uniform treatment during the peroxygen treatment. Gaseous oxygen 50 is added at the bottom of pressurized reactor 49 to provide an oxygen rich atmosphere for treatment.

One purpose of the peroxygen delignification stage is to remove a portion of the remaining lignin in a manner which prevents significant strength degradation resulting from chemical attack on the cellulose component of the fiber. It has been found that the peroxygen stage selectivity is particularly enhanced when preceded by the enzyme treatment, the enzyme treatment in the presence of peroxyacids, and alkaline peroxide soaking described in the present invention. These preceding treatments reduce the amount of delignification required to be accomplished in this stage and generally permits the strength of the pulp to be maintained at acceptable levels.

The advantages of using the combined sequence of enzyme treatment, alkaline peroxide soaking, and high consistency peroxygen delignification on waste paperboard are clearly illustrated by comparison of the kappa numbers, viscosities, and selectivities obtained to that obtained using processes described in the art of medium consistency multistage oxygen delignification. Using a two stage medium consistency oxygen delignification on waste paperboard material, the resulting pulp obtained will typically have a kappa number of about 32 and a viscosity of about 8.5 mPa.s. However, use of the present invention on the same starting waste paperboard surprisingly results in a pulp with a kappa number of 21 while the viscosity of the pulp is maintained at about 9.0 mPa.s. Comparing the selectivities obtained by the two methods, the present invention is clearly an improvement with a delignification selectivity of 1.60 compared to the two stage oxygen selectivity of 1.25.

A second important purpose of the peroxygen delignification step is to achieve chemical degradation of the remaining contaminants in the pulp stream that have not been removed by prior processing. It has been found that the peroxygen delignification stage will typically reduce the contamination of the pulp, as measured by a decrease in the Tappi dirt count, by 81%.

The effectiveness of the peroxygen delignification stage is controlled by a number of process parameters, including temperature, pressure, consistency, particle floc size, oxygen dose, the amount of metal salts, hydrogen peroxide dose, and sodium hydroxide dose.

Unlike the alkaline soaking treatment in which the temperature was much lower, the presence of transition metal ions in solution can more readily accelerate the degradation of hydrogen peroxide and oxygen to chemical species which nonselectively degrade the cellulosic materials. In a manner well known in the art, magnesium sulfate 41 may be added to protect the pulp from this attack. One mechanism by which this protection is believed to work is by the sequestering of transition metal ions by magnesium hydroxide precipitant to prevent the initiation of degradation of the peroxygen chemicals.

Another very important parameter is pulp consistency during the peroxygen stage. The pulp which is treated must have sufficient water such that the individual fibers are sufficiently saturated with water. The water allows for the transfer of the gaseous oxygen to the fiber surface and into the interior of the fibers and thereby provide more complete degradation of lignin in the fibers. Too much water inhibits the movement of gaseous oxygen to the fiber while too little water can result in severe degradation of the lignocellulosic pulp.

High consistency, in particular between 23% and 27%, is the preferred embodiment of the present invention because it retains sufficient water to provide a continuous water phase through the interior of the fiber while minimizing the amount of water between individual fibers. High consistency operation also minimizes the energy requirement to heat the pulp to the desired reaction temperature. Compared to other suggested means for delignifying waste paperboard, high consistency peroxygen delignification allows the needed kappa reduction to be accomplished in a single, low volume reactor, substantially reducing the associated capital cost requirements.

The reaction temperature at which the peroxygen stage is conducted is likewise an important controlling factor in the process of the present invention. The delignification step can be carried out over a range of temperatures from about 80° C. to up to 120° C. The preferred temperature range of the present invention is between 80° C. and 100° C., most preferred between 85° C. and 95° C. for the purpose of minimizing cellulose degradation. Higher temperatures increase the reaction rate and therefore reduce the retention time needed for treatment but also have the undesired effect of lowering the treatment selectivity. Likewise, lower reaction temperatures decrease the reaction rate and increase the necessary reaction time needed to complete the delignification reactions.

The pressure utilized in the peroxygen stage is an important parameter for maintaining the delignification efficiency and selectivity. Sufficient pressure is required to increase the transfer of oxygen into the liquid phase such that the oxygen can be transferred to reaction sites. For recycle pulp which is of high kappa number initially, sufficient oxygen is very important. Increased reactor pressure results in an improved transfer of oxygen into the water portion of the fiber and has been found to improve delignification and selectivity up to a certain pressure level. The pressure level typically found to be optimum for the present invention ranges from about 550 kPa to 830 kPa or from about 550 kPa to 700 kPa.

A further controlling factor in the peroxygen delignification stage is the relative weight of caustic, hydrogen peroxide, and oxygen used to delignify a given weight of the pulp. This amount is determined by the amount of lignin to be removed during the process balanced against the relative degradation of the cellulose which can be tolerated in the pulp product. In accordance with the present invention, an amount of oxygen, peroxide, and sodium hydroxide is used which will react with 50% to 75% of the lignin present in the pulp. All of the lignin is not to be removed in the peroxygen stage as evidence by the kappa number of 20 to 30 obtained after this stage because the chemical degradation on the cellulose by such treatment would be too severe. In the preferred method of this invention, the amount of oxygen added, based on the oven dried weight of the pulp, typically is about 3% to about 5% to reach a lignin level of 20 kappa to 30 kappa. Likewise, the amount of hydrogen peroxide added is typically about 0.5% to about 2% and the amount of sodium hydroxide added is typically about 3% to about 8%. Higher amounts of the respective chemicals may be needed if significant quantifies of dissolved solids are present in the system. Alternatively, a lesser amount of the respective chemicals may be required if a starting material of substantially lower lignin content is utilized.

The uniformity of delignification is defined, in part, to the uniformity in which oxygen is distributed to the alkaline peroxide treated fibers. This is obtained by comminution of the pulp into discrete floes of a size which is of sufficiently small diameter and bulk density such that the oxygen gas will be able to distribute freely between the floes and into the interior of the floes to complete the peroxygen delignification reactions. It is not feasible or desirable to completely separate the floes into distinct individual fibers. For the purposes of the present invention, acceptable uniformity is obtained with a floc size ranging from 5 mm to 15 mm, preferably about 10 mm or less.

At the end of the peroxygen stage, substantially delignified pulp is diluted to medium consistency with filtrate 51 that has been reinforced with additional caustic 52. This action raises the exit pH to a level sufficient to enable solubilization of lignin material and to also provide a liquid medium to facilitate diffusion of lignin material out of the fiber. As pulp 53 is discharged from the peroxygen stage, oxygen 54 is added for a final delignification action in pipeline 55. It has been found that this final treatment further boosts the delignification obtained in the stage by an additional 10%.

6. Alkaline Extraction and Washing

Having been diluted with alkaline filtrate 51 and treated with oxygen 54, the pulp is retained in extraction vessel 56 from about 30 to 60 minutes and at about 65° to 85° C. to solubilize lignin. In particular, it is the purpose of this stage to facilitate diffusion of the delignified materials from the fiber interior to the fiber exterior.

In the present invention, it is preferable to maintain the consistency of the extraction stage pulp at about 8% to 12% and at a temperature less than 85° C. No additional steam is required for temperature control for the purpose of minimizing energy needs.

In the dilution zone of tower 56 the pulp is diluted to low consistency with wash filtrate 57. Thereafter, alkali treated pulp 58 is directed to one or more washing units such that the aqueous alkaline solution is washed from the pulp so as to remove substantially all of the solubilized lignin from the pulp to form a delignified pulp of about 15 to 25 kappa units.

In the preferred embodiment of the present invention, two press washers capable of elevating the pulp consistency to at least 35% upon discharge are preferred to maximize removal of solubilized material from the pulp. Fresh wash water 63 is applied to second press washer 62 while filtrate 57 is applied to preceding first press washer 59 in an efficient counter-current washing manner. This washing process is well known to those skilled in the art and no further comment is necessary here. At least a portion of alkaline filtrate 60 from washer 59 is recovered and recycled to the extraction stage dilution zone and a portion of the filtrate is treated for suspended and dissolved solids removal and recycled to the fiber liberation step. Removal of these solids is important to prevent a high concentration from developing as a consequence of the closed nature of the process. High dissolved solids concentration can lead to scaling and corrosion of process equipment and to nonselective delignification reactions. Furthermore, substantial environmental benefits are achieved by eliminating the sewering of this filtrate.

7. Filtrate Recycle and Treatment

In the present invention, liquid wastes are eliminated by the recovery and reuse of filtrates for their chemical value and by the internal treatment of a liquid waste stream 67 whereby a substantial portion of its impurities are selectively removed and converted to usable materials. It is well known in the art that internalization of waste streams will result in a substantial increase in the dissolved solids content of the process streams. Such an increase typically leads to significant corrosion, scaling, and product quality problems during operation and costly treatment methods have been suggested to remove such solids from solution. It has been found in the present invention that the dissolved solids level can be maintained at a satisfactory level through an economical multi-step treatment in which dissolved solids are removed by conventional methods of chemical flocculation, flotation, filtration, and ion exchange techniques.

In the method of the present invention, three primary recycle loops are utilized to recover and reuse filtrates to maximize the efficiency of chemical application. In the first primary filtrate loop, a portion of the liquid from the fiber liberation stage is recovered as a filtrate 11 and reapplied to pulping unit 3 for the purpose of recovering usable enzymes and minimizing pH and temperature adjustment requirements.

In the second primary filtrate loop, alkaline filtrate 44 removed in thickening unit 43 is recovered and reapplied to mix tank 15 whereby a substantial amount of chemicals are reused. Internal to that loop is the fine decontamination step from which contaminants 73 are separated from their alkaline filtrate 72 in a screening unit 71, whereby alkaline filtrate 72 is recovered and combined for reuse with filtrate 44.

In the third primary filtrate loop, wash filtrate 67 is collected and treated in a multi-step process to reduce the solids content of the filtrate streams and to recover a delignification agent, sodium hydroxide 91. The first step of treatment for filtrate 67 involves the flocculation of organic solids through the use of chemical polymers 75. The solids are then removed as a sludge 74 with a solids concentration of about 3% by weight by means of a conventional flotation-filtration unit 76. It has been found that greater than 95% removal of the suspended organic solids and 15% of the dissolved organic solids may be removed in such treatment. Sludge stream 74 is collected, combined with contaminant streams 69 and 73, and dewatered in sludge press 99. Filtrate 100 is recovered and recombined with filtrate 67 to be retreated for solids removal.

Treated filtrate 77 is passed through a two stage ion exchange system to remove dissolved ions. In ion exchange unit 78, cations such as calcium, magnesium, manganese, potassium, and iron are exchanged with sodium ions on a resin which is subsequently stripped and regenerated with a sodium chloride solution 79. A concentrated waste stream 80 is produced which contains soluble metals for an overall removal efficiency from the filtrate of greater than 98%.

In ion exchange unit 82, hydrogen ions are selectively exchanged for sodium ions on a resin which is subsequently stripped and regenerated with a hydrochloric acid solution 83 to produce a relatively pure concentrated stream of sodium chloride solution 84. The overall removal efficiency of sodium from filtrate 81 is typically greater than 90%. High metal removal efficiency in the first ion exchange unit is important to prevent contamination of the sodium chloride solution 84 which is subsequently converted to sodium hydroxide 91. Treated filtrate 85 is returned to the process as dilution water in pulping unit 3.

Concentrated brine 80 from unit 78 is treated further with chemical precipitants 86 by means well known in the art to remove concentrated metal salts 89 which are subsequently disposed of as a solid waste. The liquid portion of brine solution 80 is recovered as a filtrate 88 and applied as dilution in storage tower 65.

Concentrated sodium chloride solution 84 is converted to sodium hydroxide 91 in a conventional caustic-chlorine electrolytic cell 90. By-products of the electrolytic conversion of sodium chloride to sodium hydroxide are hydrogen gas 93 and chlorine gas 92 which are collected and burned in a combustion unit 94 to produce a high purity hydrochloric acid gas 95. The gas is subsequently cooled and absorbed in absorption unit 96 to produce a pure hydrochloric acid solution 97 which can be used as the regenerant stream for ion exchange unit 82. The means to produce sodium hydroxide by electrolysis of sodium chloride and to produce hydrochloric acid by the combustion of hydrogen and chlorine are well known in the chemical field and need not be discussed further in this specification.

Accordingly, the process of the present invention achieves substantial environmental advantages with respect to the discharge of pollutants. The selected use of delignification agents such as oxygen, hydrogen peroxide, and sodium hydroxide limits the generation of inorganic solids which must be removed from solution and eliminates the generation of sulfur containing pollutants associated with the evaporation and incineration steps of comparable processes. The novel combination of technologies allows substantial removal of impurities from the process water such that the water may be retained in the process without detrimental effects to process operation.

Collection and conversion of the impurities to sodium hydroxide for reuse in the process, while using well known means, is unique in its application to solve a well known industrial problem at a low cost in relation to prior art processes. Such a process can be constructed and operated without affecting kraft chemical recovery operations and without cosily treatment technologies such as recovery boilers, evaporation, crystallization, reverse osmosis, and ultrafiltration. The capital cost associated with the waste treatment aspects of this invention that is required to achieve system closure is projected to be 10% to 20% of that taught in the prior art. Similarly, the total process capital cost of the present invention is projected to be 50% to 60% of that taught in the prior art to accomplish similar means. Furthermore, utilization of predominantly low temperature and medium to high consistency processing allows for a substantially reduced expenditure of energy when compared to prior art processes associated with the conversion of waste lignocellulosic material to a lignocellulosic recycle pulp for the purpose of bleaching.

EXAMPLES

The scope of the invention is further described in connection with the following examples which are set forth for the purpose of illustration only and which are not to be construed as limiting the scope of the invention in any manner. Unless otherwise indicated, all chemical percentages are calculated on the basis of the weight of oven dried (OD) fiber. Also, one skilled in the art would understand that the measurement data indicated in the examples do not need to be precisely achieved and are subject to an inherent degree of experimental and measurement error. Furthermore, the paperboard raw material used in the experimentation performed for developing the following examples was collected from local business establishments and are therefore subject to a high degree of variability.

a. Example 1

Old corrugated containers were torn by hand into small pieces and allowed to soak in tap water at 50° C. with its pH adjusted to a value of 10.0 for a period of one hour. The material was then disintegrated in a blender for 5 minutes The resulting pulp had a kappa number of 90.8 and a viscosity of 17.0 mPa.s.

A portion of the disintegrated pulp, henceforth known in this example as the Control Pulp, was subsequently screened by hand on a 42 mesh screen which resulted in 42% by weight of the waste material being retained on the screen as rejectable material. The rejected material consisted primarily of fiber clumps and poorly digested fibrous material commonly known as shives.

The remaining unscreened pulp was split into two portions, henceforth known in this example as Pulp 1 and Pulp 2, which were then subjected to alkaline soaking conditions (Table I) with and without hydrogen peroxide addition. The treated pulps were subsequently disintegrated a second time for 30 seconds and screened by hand on a 42 mesh screen to determine the effect of treatment conditions on the amount of rejectable material (Table II).

As shown in Table II below, the alkaline peroxide soaking step taught in the present invention produced a pulp (Pulp 2) with a substantial reduction in rejectable material than a recycled paperboard, not receiving treatment (Control Pulp) or one receiving only caustic treatment (Pulp 1) as taught in the prior art. Surprisingly, a substantial amount of delignification was also achieved under these mild reaction conditions and despite an apparent loss in pulp viscosity which generally serves as an indicator of pulp strength, the alkaline peroxide treated pulp (Pulp 2) maintained a higher pulp strength in comparison to the Control Pulp.

TABLE I

RECYCLED PAPERBOARD
ALKALINE SOAKING CONDITIONS

| Treatment Condition | Control Pulp | Pulp 1 | Pulp 2 |
|---|---|---|---|
| Beginning Kappa | 90.8 | 90.8 | 90.8 |
| Beginning Viscosity (mPa · s) | 17.0 | 17.0 | 17.0 |
| Time (Hours) | 0 | 18.5 | 18.5 |
| Temperature (°C.) | — | 50.0 | 50.0 |
| Consistency (%) | — | 9.0 | 9.0 |
| NaOH Applied (%) | 0 | 2.8 | 2.8 |
| $H_2O_2$ Applied (%) | 0 | 0.0 | 1.7 |

The present example serves to illustrate the advantages of the alkaline peroxide soaking step taught in the present invention over processes taught in the prior art as it relates to reducing screening losses which in turn reduce the process yield. In addition, the simplicity of soaking under mild conditions to achieve substantial delignification reduces the process complexity and capital cost requirements, and minimizes energy needed in comparison to the prior art which teaches high temperature and pressure digestion. Furthermore, the present example illustrates how the soaking step in the present invention maintains or enhances the pulp strength.

TABLE II

TREATED PULP CHARACTERISTICS

| Property | Control Pulp | Pulp 1 | Pulp 2 |
|---|---|---|---|
| % Retained on 42 mesh screen | 42.0 | 12.4 | 7.5 |
| Final Kappa | 90.8 | 85.4 | 77.5 |
| Final Viscosity, (mPa · s) | 17.0 | 16.4 | 11.4 |
| Delignification (%) | 0.0 | 5.9 | 14.6 |
| Tensile Strength (kN/m) | 2.24 | 2.35 | 2.44 | b. Example 2

Old corrugated containers were torn by hand into small pieces and allowed to soak in tap water at 50° C. with a xylanase enzyme as described in Table III. The material was then disintegrated in a blender for 5 minutes For purposes of comparison in the present example, Pulp 2 and Control Pulp from Example 1 shall henceforth be known as the Untreated Pulp and the Untreated Control Pulp, respectively.

The disintegrated pulp, henceforth known in this example as the Enzyme Treated Pulp, was subjected to alkaline peroxide soaking conditions as described in Table IV. The treated pulp was disintegrated a second time for 30 seconds and subsequently screened by hand on a 42 mesh screen to determine the effect of treatment conditions on the amount of rejectable material. Pulp characteristics after their respective treatments are summarized in Table V.

TABLE III

RECYCLED PAPERBOARD
ENZYME TREATMENT CONDITIONS

| Treatment Condition | Parameter |
|---|---|
| Xylanase Applied, XU/gm | 5.0 |
| Initial pH | 4.5 |
| Time (Hours) | 1.0 |
| Temperature (°C.) | 50.0 |
| Consistency (%) | 12.0 |

As shown in Table V below, the enzyme pretreatment step further enhances the alkaline peroxide soaking step of the present invention by further reducing the screen rejects loss to 5.0% and further increasing the degree of pulp delignification to 17.6% without any loss in pulp strength and at one-half the soaking time of the comparison pulps (9.5 hours versus 18.5 hours).

The present example serves to illustrate the advantage of including xylanase enzyme pretreatment prior to the alkaline peroxide soaking step. The substantial reduction in soaking time and added delignification further reduces the capital cost requirements for storage volume or for high pressure delignification processes that would be associated with prior art processes.

TABLE IV

RECYCLED PAPERBOARD
ALKALINE SOAKING CONDITIONS

| Treatment Condition | Enzyme Treated Pulp |
|---|---|
| Beginning Kappa | 90.8 |
| Beginning Viscosity, (mPa · s) | 17.0 |
| Time (Hours) | 9.5 |
| Temperature (°C.) | 50.0 |
| Consistency (%) | 9.0 |
| NaOH Applied (%) | 2.8 |
| $H_2O_2$ Applied (%) | 1.7 |

TABLE V

PULP CHARACTERISTICS

| Property | Untreated Control Pulp | Untreated Pulp | Enzyme Treated Pulp |
|---|---|---|---|
| % Retained on 42 mesh screen | 42.0 | 7.5 | 5.0 |
| Final Kappa | 90.8 | 77.5 | 74.8 |
| Final Viscosity | 17.0 | 11.4 | 11.3 |
| Delignification (%) | 0 | 14.6 | 17.6 |
| Tensile Strength (kN/m) | 2.24 | 2.35 | 2.51 | c. Example 3

Old corrugated containers were tom by hand into small pieces and allowed to soak in tap water at 50° C. with a xylanase enzyme as described in Table III. The material was then disintegrated in a blender for 5 minutes and subjected to alkaline peroxide soaking conditions as described in Table IV. The treated pulp was disintegrated a second time for 30 seconds and subsequently screened by hand on a 42 mesh screen to remove 5% by weight of unacceptable material which was discarded. The enzyme treated, screened, and alkaline peroxide treated pulp, henceforth known in this example as the Control Pulp, was then tested for freeness, average fiber length, and pulp strength (Table VI).

A portion of the control pulp, henceforth known in this example as the Fractionated Pulp, was further screened by hand on an 80 mesh screen to allow about 9% by weight of fine material in the pulp to pass through the screen and be discarded. The Fractionated Pulp (retained on screen) was similarly tested for comparison to the Control Pulp properties (Table VI).

As indicated in Table VI below, removal of the fine fraction of the pulp composition increases the average fiber length of the pulp by almost 5%. One skilled in the art would expect a similar proportional increase in pulp strength since fiber length has been shown to be directly proportional to tensile strength. Furthermore, since chemical pulp fines typically have a higher bond strength, one skilled in the an may even expect a somewhat smaller strength increase relative to the fiber length increase. Surprisingly, the fractionating increases the pulp strength by approximately 11% thereby implying that the fine debris that was removed possessed poorer bonding properties in comparison to the remaining pulp. It is hypothesized that this poorly bonding fiber debris originates, in part, from previously well-bonded sites which are removed during repulping, and in pan, from mechanical pulp fiber originating in the corrugating medium itself.

A further benefit of removing the fine debris is a substantial increase in the apparent drainage rate as measured by the Canadian Standard Freeness test.

The present example serves to illustrate the advantage of the fine decontamination step of the present invention. The apparent strength gained from the removal of poorly bonding fine debris is additive to the gain previously demonstrated in Example 1. The fine screening step also produces a pulp which has improved drainage characteristics over recycled pulps prepared according to prior art processes.

TABLE VI

PULP CHARACRERISTTCS OF
FINE SCREENING STEP

| Property | Control Pulp | Fractionated Pulp |
|---|---|---|
| Freeness, ml | 610 | 745 |
| Fiber Length, mm | 2.55 | 2.67 |
| Tensile Strength, kN/m | 2.51 | 2.79 | d. Example 4

Wax coated old corrugated paperboard was tom by hand into small pieces and allowed to soak in tap water at 50° C. with its pH adjusted to a value of 10.0 for a period of one hour. The material was then disintegrated in a blender for a period of five minutes The resulting pulp, which had a kappa number of 78.5 and a viscosity of 19.5 mPa.s, was split into two portions, henceforth known in this example as Pulp 1 and Pulp 2, each of which was then subjected to alkaline peroxide soaking conditions at different temperatures according to the conditions set forth in Table VII.

A third portion of wax coated corrugated paperboard was allowed to soak in a likewise manner for a one hour period in the presence of a blend of enzymes which included a cellulase, a xylanase, and a lipase. The soaking conditions were adjusted to the optimum activity conditions for the enzymes which included a pH 4.5 and a temperature of 50° C. The resulting pulp, henceforth known in this example as Pulp 3 was subjected to alkaline peroxide soaking conditions set forth in Table VII.

After soaking, the pulps were disintegrated for 30 seconds and handsheets were made and air dried for the purpose of observing the effect of the soaking temperature and enzyme treatment on the size of the wax contaminants retained in the pulp. The average particle size was determined by measuring the largest dimension of the visually detectable wax contaminants on the top side of each handsheet and calculating the average size. Results are given below in Table VIII.

TABLE VII

RECYCLED WAX COATED PAPERBOARD ALKALINE SOAKING CONDITIONS

| Treatment Condition | Pulp 1 | Pulp 2 | Pulp 3 |
|---|---|---|---|
| Beginning Kappa | 78.5 | 78.5 | 78.5 |
| Beginning Viscosity (mPa · s) | 19.5 | 19.5 | 19.5 |
| Time (Hours) | 18.5 | 18.5 | 18.5 |
| Temperature (°C.) | 50.0 | 60.0 | 50.0 |
| Consistency (%) | 9.0 | 9.0 | 9.0 |
| NaOH Applied (%) | 2.8 | 2.8 | 2.8 |
| $H_2O_2$ Applied (%) | 1.7 | 1.7 | 1.7 |

The remaining portions of Pulp 1, Pulp 2, and Pulp 3 were screened on a 42 mesh screen for the purpose of determining the effect of temperature and enzyme treatment on the mass of wax paperboard screen rejects (Table VIII).

As indicated in Table VIII below, the processing of Pulp 1 at a reduced temperature in comparison to Pulp 2 resulted in a substantial increase in the wax contaminant size as well as the mass in rejected material. Visual inspection of the contaminants indicated that the mass differences between the pulps are related to the presence of wax contaminants and usable lignocellulosic fiber. Since the average flake size of Pulp 2 was about 58% smaller than Pulp 1 it is likely that a significant portion of the wax material passed through the screen. This was evident in very small observable wax contaminants in the screened pulp. In contrast, however, the reject mass of Pulp 2 was only about 35% less than that of Pulp 1. The lack of proportionality in change of these two parameters suggests an unequal loss of the relative amounts of fiber and wax components for the two treatments. It was concluded that treatment at higher temperature reduces the separability of the wax material from the pulp and will result in a relatively larger fiber loss when removing a given amount of contaminants from the pulp.

The advantage of low temperature processing was evident for Pulp 3 which was treated with enzymes prior to alkaline peroxide soaking. The average wax size of Pulp 3 was smaller than Pulp 1, reflecting degradation of fatty acids in the wax by the lipase enzyme. However, the amount of lignocellulose material retained with the wax, as indicated by the reduction in screen rejects and by visual observation, was less than without enzyme treatment. It was concluded that enzyme treatment enhances the fine decontamination step by improving the separation between wax and fiber components.

TABLE VIII

TREATED PULP CHARACTERISTICS FROM WAX COATED BOARD

| Property | Pulp 1 | Pulp 2 | Pulp 3 |
|---|---|---|---|
| % Retained on 42 mesh screen | 14.5 | 9.4 | 9.0 |
| Average Wax Flake Size (mm) | 3.8 | 1.6 | 3.2 |

The present example serves to illustrate the advantages of operating the alkaline peroxide soaking stage at a low temperature and in pretreating the waste paperboard with enzymes. Such treatment maintains a larger wax contaminant size such that removal in the fine decontamination step is easier to accomplish with a higher degree of efficiency. Furthermore, enzyme treatment improves the separation between wax and fiber such that fiber yield losses in the decontamination step are reduced.

e. Example 5

Old corrugated containers were torn by hand into small pieces and allowed to soak in tap water at 50° C. with its pH adjusted to a value of 10.0 for a period of one hour. The material was then disintegrated in a blender for 5 minutes. The resulting pulp had a kappa number of 85.0 and a viscosity of 17.0 mPa.s.

The disintegrated pulp was subsequently screened by hand on a 42 mesh screen which resulted in 47% by weight of the waste material being retained as rejectable material. The rejected material consisted primarily of fiber clumps and poorly digested fibrous material commonly known as shives.

The screened pulp was split into two portions and delignified according to the conditions set forth in Table IX. The portion of screened pulp known henceforth in this example as Pulp 1 was delignified with a single stage of medium consistency oxygen delignification while a portion of the screened pulp known henceforth in this example as Pulp 2 was delignified with a single stage of high consistency peroxygen delignification.

TABLE IX

DELIGNIFICATION CONDITIONS FOR EXAMPLE 5

| Treatment Condition | (M.C.) Pulp 1 | (H.C.) Pulp 2 |
|---|---|---|
| Beginning Kappa | 85.0 | 85.0 |
| Beginning Viscosity | 17.0 | 17.0 |
| Time (minutes) | 60.0 | 30.0 |
| Temperature (°C.) | 93.0 | 93.0 |
| Pressure (kPa) | 585.0 | 690.0 |
| Consistency (%) | 11.0 | 27.0 |
| NaOH Applied (%) | 10.0 | 6.0 |
| $H_2O_2$ Applied (%) | 0.0 | 1.5 |
| $MgSO_4$ (%) | 0.5 | 0.5 |

Results of the delignification of Pulp 1 and Pulp 2 are given below in Table X. Despite the use of a substantially lower amount of sodium hydroxide (40% less), high consistency treatment of Pulp 2 with hydrogen peroxide and oxygen achieved about 25% more delignification than medium consistency oxygen treatment. Pulp 2 treatment also exhibited about a 35% improved degree of selectivity over Pulp 1 treatment. At a 21.8 kappa, the waste lignocellulose pulp can be directly bleached with substantially less bleach chemical than Pulp 1.

Prior art teaches that it is preferable to delignify by multiple stages of oxygen delignification to reach the kappa numbers attainable by the present invention in as selective of a manner. In the present example, processing at high consistency substantially reduces the amount of heat energy required to delignify the pulp by about 64%. Furthermore, the volumetric requirements for delignification is substantially reduced by about 83%. Since two stage oxygen delignification would be required to achieve similar results of the present invention, the medium consistency processing would likely require about 90% more treatment volume and additional heat energy as well. The reduction in pressurized treatment volume and energy requirements of the present invention has a substantial impact on the capital equipment and operating costs.

The present example serves to illustrate the advantages of including a high consistency peroxygen treatment step in the present invention. Delignification and selectivity are substantially enhanced with such treatment and capital equipment and operating costs are substantially reduced.

TABLE X

DELIGNIFICATION RESULTS FOR EXAMPLE 5

| Treatment Condition | (M.C.) Pulp 1 | (H.C.) Pulp 2 |
| --- | --- | --- |
| Final Kappa | 34.4 | 21.8 |
| Final Viscosity (mPa · s) | 7.7 | 8.4 |
| Delignification (%) | 59.5 | 74.4 |
| Viscosity Loss (%) | 54.7 | 50.6 |
| Selectivity | 1.09 | 1.47 |
| Energy Required (J/g of Waste) | 1605 | 582 |
| Vessel Size Required (m$^3$/1000 kg Waste) | 0.404 | 0.070 |

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

I claim:

1. A process for purifying and delignifying a waste lignocellulosic material which comprises the following steps in the order stated without additional intervening delignification steps:

(a) substantially separating discrete fibers and contaminants by subjecting said waste lignocellulosic material to agitation in an aqueous vehicle, in the presence of biologically produced enzymes at a temperature of 40° C. to 50° C. to form a dispersed pulp mass having a kappa number of 80 to 120;

(b) removing large and dense contaminants from said dispersed pulp mass to form a partially cleaned pulp;

(c) mechanically and chemically conditioning said partially cleaned pulp mass by first thickening to a consistency of about 30% to 40%, diluting to a consistency of 2% to 4% with a solution containing sodium hydroxide and hydrogen peroxide, blending the alkaline pulp mixture for a period of at least about one minute, and thickening said alkaline pulp mixture to a consistency of about 15% to 20%;

(d) partially delignifying and further separating discrete fibers and contaminants by retaining and soaking said alkaline pulp mixture for an extended time period at a temperature of 40° C. to 50° C. to form a partially delignified pulp of about 70 kappa units or less;

(e) removing small and low density contaminants from said partially delignified pulp to form a substantially decontaminated pulp;

(f) selectively removing fine lignocellulosic debris from said substantially decontaminated pulp to obtain a fractionated pulp having a Canadian Standard Freeness of about 675 ml to 750 ml;

(g) subjecting said fractionated pulp to peroxygen delignification at a temperature of about 80° C. to 100° C., and an oxygen pressure of about 550 kPa to 700 kPa for a time sufficient to lower the kappa number to 20 to 30, said peroxygen delignification consisting essentially of a single stage of exposing said fractionated pulp in an aqueous vehicle at a consistency of about 20% to 30%, to oxygen gas in the presence of sodium hydroxide and hydrogen peroxide;

(h) extracting a portion of the aqueous alkaline solution so as to remove substantially all of the solubilized lignin therefrom to form a substantially delignified pulp of about 15 to 25 kappa units;

(i) washing said substantially delignified pulp to form a lignocellulosic brownstock pulp;

(j) wherein at least a portion of the wash water effluent from the substantially delignified pulp washing step is recycled countercurrently to a previous treatment step, and further wherein at least a portion of said wash water effluent is treated by separation means so as to remove substantially all of the suspended solids and a portion of the dissolved solids to produce a partially clean effluent;

(k) further treatment of said partially clean effluent by ion exchange means so as to substantially remove sodium ions and other metal ions to produce a substantially clean effluent having a considerably decreased dissolved solids content;

(l) wherein said substantially clean effluent is recycled countercurrently to a previous treatment step, and whereby the discharge of environmentally harmful liquid effluent streams is substantially eliminated.

2. The process of claim 1, wherein said waste lignocellulosic material is substantially contaminated with wax or polymeric coatings.

3. The process of claim 1, wherein said biologically produced enzymes include a lipase enzyme, a xylanase enzyme, and a cellulase enzyme.

4. The process of claim 1, wherein pH adjustment in step (a) is accomplished using a peroxyacid.

5. The process of claim 1, wherein said sodium ions are converted to sodium hydroxide by electrolytic means to produce a substantially pure sodium hydroxide solution, and further wherein said sodium hydroxide is recycled to a previous delignifying treatment stage.

* * * * *